(12) United States Patent
Li (10) Patent No.: US 11,822,841 B2
(45) Date of Patent: Nov. 21, 2023

(54) METHOD AND APPARATUS FOR MONITORING PRINT JOB, AND ELECTRONIC APPARATUS

(71) Applicant: Zhuhai Pantum Electronics Co., Ltd., Zhuhai (CN)

(72) Inventor: Haixiong Li, Zhuhai (CN)

(73) Assignee: ZHUHAI PANTUM ELECTRONICS CO., LTD., Zhuhai (CN)

( * ) Notice: Subject to any disclaimer, the term of this patent is extended or adjusted under 35 U.S.C. 154(b) by 0 days.

(21) Appl. No.: 17/945,093

(22) Filed: Sep. 15, 2022

(65) Prior Publication Data

US 2023/0088527 A1    Mar. 23, 2023

(30) Foreign Application Priority Data

Sep. 23, 2021   (CN) .......................... 202111116846.8

(51) Int. Cl.
G06F 15/00    (2006.01)
G06F 3/12     (2006.01)

(52) U.S. Cl.
CPC ............ G06F 3/1259 (2013.01); G06F 3/121 (2013.01); G06F 3/1222 (2013.01); G06F 3/1274 (2013.01)

(58) Field of Classification Search
CPC ...... G06F 3/1259; G06F 3/121; G06F 3/1222; G06F 3/1274
USPC ...................................................... 358/1.14
See application file for complete search history.

(56) References Cited

U.S. PATENT DOCUMENTS

| | | | | |
|---|---|---|---|---|
| 6,724,494 B1* | 4/2004 | Danknick | ............ | G06F 3/1285 |
| | | | | 358/1.14 |
| 8,687,208 B2* | 4/2014 | Nakatsuka | ............ | G06F 3/1273 |
| | | | | 358/1.14 |
| 9,141,323 B1* | 9/2015 | Ono | ........................ | G06F 3/121 |
| 9,898,233 B2* | 2/2018 | Kuroda | ................. | G06F 3/1258 |
| 11,082,577 B2* | 8/2021 | Totsuka | ............ | H04N 1/00917 |
| 2004/0218204 A1* | 11/2004 | Nomura | ................ | H04L 69/329 |
| | | | | 358/1.14 |
| 2007/0153313 A1* | 7/2007 | Han | ....................... | G06F 3/1274 |
| | | | | 358/1.13 |
| 2016/0210094 A1* | 7/2016 | Nishikawa | ......... | H04N 1/00411 |
| 2017/0060502 A1* | 3/2017 | Ikeda | ................. | H04N 1/00477 |
| 2017/0206042 A1* | 7/2017 | Kashiwagi | ............ | G06F 3/1222 |
| 2018/0300090 A1* | 10/2018 | Lin | ....................... | G06F 3/1204 |
| 2019/0146727 A1* | 5/2019 | Suzuki | .................. | G06F 3/1267 |
| | | | | 358/1.15 |
| 2019/0205074 A1* | 7/2019 | Coons | ................... | G06F 3/1207 |
| 2019/0310809 A1* | 10/2019 | Sekine | ................. | G06F 3/1235 |
| 2021/0109689 A1* | 4/2021 | Mayer | .................. | G06F 3/1267 |

* cited by examiner

*Primary Examiner* — Mark R Milia
(74) *Attorney, Agent, or Firm* — ANOVA LAW GROUP PLLC (57) ABSTRACT

Embodiments of the present disclosure provide a method and an apparatus for monitoring a print job, and an electronic apparatus. The method includes receiving a print job; analyzing the print job and acquiring creation time of the print job; comparing the creation time with current time, and continuing to print the print job if a time difference between the creation time and the current time is less than a first preset value; determining whether the print job satisfies a print cancellation condition if the time difference between the creation time and the current time is equal to or greater than the first preset value; and cancelling the print job if the print job satisfies the print cancellation condition.

13 Claims, 5 Drawing Sheets

METHOD AND APPARATUS FOR MONITORING PRINT JOB, AND ELECTRONIC APPARATUS

CROSS-REFERENCE TO RELATED APPLICATION

This application claims the priority to Chinese patent application No. 202111116846.8, filed on Sep. 23, 2021, in the China National Intellectual Property Administration, the entirety of which is incorporated herein by its reference.

TECHNICAL FIELD

The present disclosure generally relates to the field of image forming technology and, more particularly, relates to a method and an apparatus for monitoring a print job, and an electronic apparatus.

BACKGROUND

A print job sent to an image forming apparatus (such as a printer) may be executed on the computer. For example, after a user clicks a print icon on a document in an application program, the application program may send the print document to a print spooler on the computer, where the print document waits for the rendering process of a print driver and may transmit the rendered print document to the image forming apparatus for outputting a paper document.

Application scenario problems in the existing technology are described hereinafter.

The printer may continue to print multiple jobs, and multiple users may send print jobs to the printer. A new user may send a print job to the printer; and since the user does not know how long it would take for previous print jobs to be completed, the user may give up waiting for the print job to be printed. However, the user may not cancel the print job sent to the print spooler, which may result in that after the printer completes previous print jobs, the queued print job of the user may be printed out, and the user may not in front of the apparatus, resulting in print content leakage. To cancel the print job sent to the print spooler, only a user with a certain technical knowledge may find a job deleting manner, and different operating systems may have different processing manners.

The printer may fail during the printing process, such as paper shortage or internal paper jam; current user may not have the ability to troubleshoot the printer; and after next user clears the failure, unfinished print job of such user may be printed out, resulting in information leakage.

The computer may send print jobs continuously, and the printer may suddenly have a power failure/outage during the printing process. After the power supply is restored, the computer may re-send the print jobs to the printer for print output, resulting in information leakage.

SUMMARY

One aspect of the present disclosure provides a method for monitoring a print job. The method includes receiving a print job; analyzing the print job and acquiring creation time of the print job; comparing the creation time with current time, and continuing to print the print job if a time difference between the creation time and the current time is less than a first preset value; determining whether the print job satisfies a print cancellation condition if the time difference between the creation time and the current time is equal to or greater than the first preset value; and cancelling the print job if the print job satisfies the print cancellation condition.

Another aspect of the present disclosure provides a method for monitoring a print job. The method includes, when an error occurs in a print operation of the print job and resuming processing the print job after the error is resolved, acquiring stop time of the print job; comparing the acquired stop time with the current time, and continuing to print the print job if a time difference between the stop time and the current time is less than a second preset value; and deleting the print job if the time difference between the stop time and the current time is equal to or greater than a first preset value.

Another aspect of the present disclosure provides an apparatus for monitoring a print job. The apparatus includes a receiving unit, configured to receive a print job; an analyzing unit, configured to analyze the print job and acquiring creation time of the print job; and a processing unit, configured to compare the creation time with current time, and continue to print the print job if a time difference between the creation time and the current time is less than a first preset value; and configured to determine whether the print job satisfies a print cancellation condition if the time difference between the creation time and the current time is equal to or greater than the first preset value, and cancel the print job if the print job satisfies the print cancellation condition.

Another aspect of the present disclosure provides an electronic apparatus, including a memory, a processor and a computer program, where the computer program is stored in the memory and configured to be executed by the processor to implement above-mentioned methods.

Another aspect of the present disclosure provides a non-transitory computer-readable storage medium, including a computer program, where when being executed, the computer program implements above-mentioned methods.

Other aspects of the present disclosure can be understood by those skilled in the art in light of the description, the claims, and the drawings of the present disclosure.

BRIEF DESCRIPTION OF THE DRAWINGS

To clearly describe technical solutions of various embodiments of the present disclosure, the drawings need to be used for describing various embodiments are described below. Obviously, the drawings in the following description are merely some embodiments of the present disclosure. For those skilled in the art, other drawings may be acquired in accordance with these drawings without creative efforts.

DETAILED DESCRIPTION

To better understand technical solutions of the present disclosure, embodiments of the present disclosure are described in detail with reference to accompanying drawings.

It should be noted that described embodiments are only a part of embodiments of the present disclosure, rather than all embodiments. Based on embodiments in the present disclosure, all other embodiments obtained by those skilled in the art without creative work shall fall within the protection scope of the present disclosure.

In the embodiment of the present disclosure, the image forming apparatus may be an apparatus having at least one function related to image formation. Above-mentioned functions related to image formation may include, but may not be limited to, a printing function, a scanning function, a copying function, and a facsimile function.

A single-function printer is an image forming apparatus with a printing function only.

A multi-function printer is an image forming apparatus with printing, copying, scanning, and/or faxing functions, where the number of paper trays may be selectively configured.

For a digital compound machine, based on the copying function with standard or optional printing, scanning, faxing functions, file output may be performed by a laser printing manner using digital principle; and images and texts may be edited as needed. The digital compound machine may have a large capacity paper tray, with high memory, large hard disk, strong network support and multitasking parallel processing capability.

Figure 1:
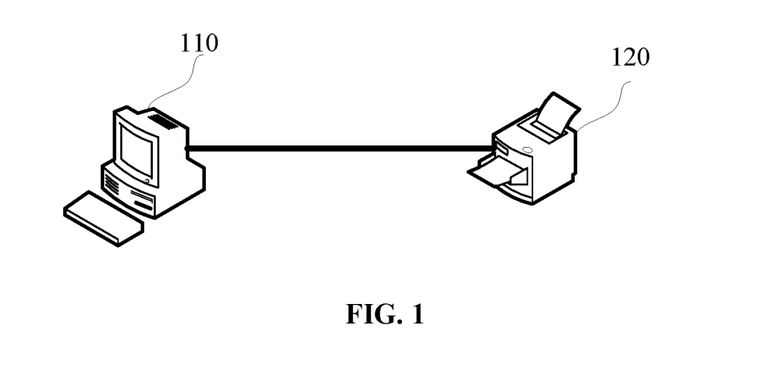
FIG. 1 illustrates a schematic of a system applicable for a method for monitoring a print job provided by exemplary embodiments of the present disclosure.

Scenarios applicable to the method for monitoring a print job provided by embodiments of the present disclosure are exemplarily illustrated hereinafter. FIG. 1 illustrates a schematic of a system applicable to a method for monitoring a print job provided by exemplary embodiments of the present disclosure. The system may include a first electronic apparatus 110 and an image forming apparatus 120, where data communication may be between the first electronic apparatus 110 and the image forming apparatus 120. Above-mentioned image forming apparatus 120 may include, but may not be limited to, following apparatuses including a single-function printer, a multi-function printer, a digital composite machine, and/or the like.

The connection manner between the first electronic apparatus 110 and the image forming apparatus 120 may not be limited in embodiments of the present disclosure. In a possible implementation manner, the first electronic apparatus 110 and the image forming apparatus 120 may be connected through a local area network; in another possible implementation manner, the image forming apparatus 120 may be connected to the first electronic apparatus 110 through a USB cable; and in another possible implementation manner, the image forming apparatus 120 may be connected to the first electronic apparatus 110 through a wireless manner, such as Bluetooth or Wi-Fi Direct.

In embodiments of the present disclosure, the first electronic apparatus 110 may transmit a print job to the image forming apparatus 120 for performing print output. Normally, a print driver of the image forming apparatus 120 may be installed in the first electronic apparatus 110, so that the application program on the first electronic apparatus 110 may issue print data to the image forming apparatus 120.

Figure 2:
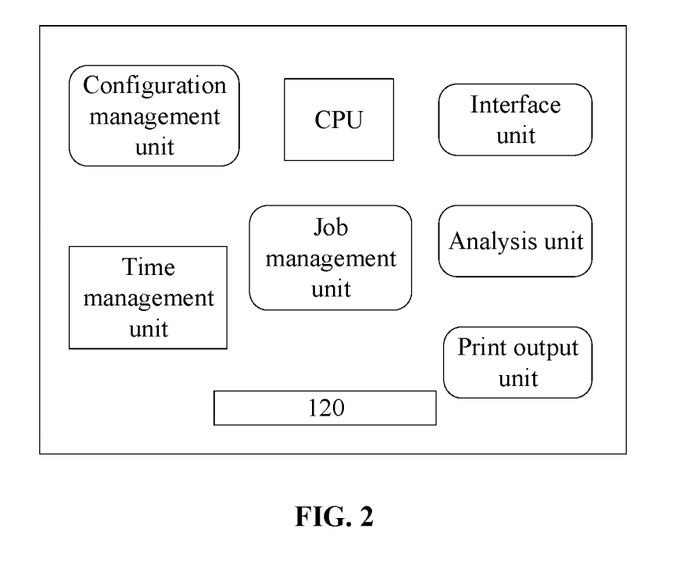
FIG. 2 illustrates a component block diagram of an image forming apparatus provided by exemplary embodiments of the present disclosure.

FIG. 2 illustrates a component block diagram of an image forming apparatus provided by exemplary embodiments of the present disclosure.

As shown in FIG. 2, a configuration management unit may be configured for an administrator to configure parameters for the printer. In embodiments of the present disclosure, the administrator may configure the print job overtime setting.

An interface unit may be configured to communicate with the first electronic apparatus 110 to construct a communication path.

An analysis unit may be configured for performing identifying and image processing of received print job.

A time management unit may be configured for precise timing and providing time data to the control system of the image forming apparatus.

A print output unit may be configured for printing out received print jobs onto print paper.

A job management unit may be configured to monitor print tasks, record the information of print jobs in current print task, including current status, the print starting time, the print pausing time, and the print ending time of the print job (including error, cancellation, and the like). If multiple print tasks can be cached in the image forming apparatus simultaneously, the multiple print tasks may be monitored, or the print queue formed in the image forming apparatus may be monitored. The function of the print queue may be same as that of above-mentioned print spooler, and both may be configured for buffering multiple print tasks or print jobs.

A CPU unit may be a main unit that executes the print job.

Different print tasks may be included. For example, one print task may include a print job; if the print job is executed, the job management unit may end the print task. However, one print task may include multiple print jobs. In such case, the user may execute multiple copies of print document on the computer and configure collation printing. Therefore, the print document may generate multiple same print jobs which belong to a same print task in the image forming apparatus 120. When receiving the first copy of the print job of the print document, the image forming apparatus 120 may identify that the print task includes multiple same print jobs, and the job management unit and the CPU may perform monitoring a print overtime process of the print task.

Exemplary Embodiment One

Embodiments of the present disclosure provide a method for monitoring a print job, which is applicable for a printer, identifies received print jobs, and when an overtime print job is found, deletes the overtime print job to protect user data privacy.

Figure 3:
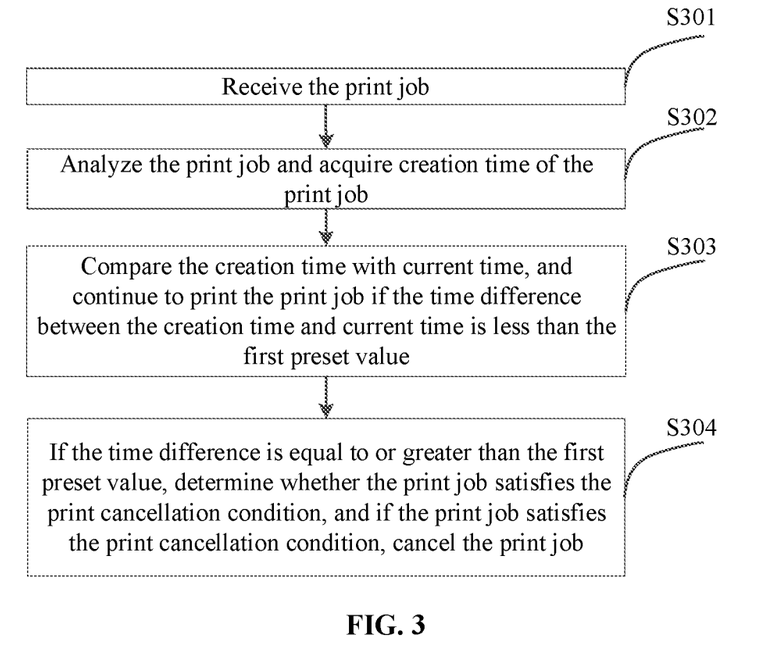
FIG. 3 illustrates a flow chart of a method for monitoring a print job provided by exemplary embodiment one of the present disclosure.

As shown in FIG. 3, a method for monitoring a print job may include following exemplary steps.

At S301, a print job may be received.

At S302, the print job may be analyzed, and the creation time of the print job may be acquired.

At S303, the creation time may be compared with current time, and if the time difference between the creation time and current time is less than the first preset value, the print job may continue to be printed.

At S304, if the time difference between the creation time and current time is equal to or greater than the first preset value, it may determine whether the print job satisfies a print cancellation condition; and if the print job satisfies the print cancellation condition, the print job may be canceled.

According to embodiments of the present disclosure, when it is found that the difference between the creation time of received print job and current time is excessively large, it indicates that the print job may be an overtime job which needs to be deleted to protect the user's data security.

Furthermore, determining whether the print job satisfies the print cancellation condition and cancelling the print job if the print job satisfies the print cancellation condition may include determining whether the print job belongs to a print task monitored in a print queue of the image forming apparatus; if the print job belongs to the print task monitored in the print queue of the image forming apparatus, determining whether the print task to which the print job belongs is a print task that includes multiple print jobs which are continuously being printed; and if the print task to which the print job belongs is not a print task that includes multiple print jobs which are continuously being printed, cancelling the print job. For example, whether the print job belongs a queued print task may be determined. If the print job belongs a queued print task, it may determine whether the print task to which the print job belongs is a print task that includes multiple print jobs (for example, if two prints are performed on a document, that is, one print task includes two print jobs with same print content) and whether one of the print jobs is being executed. If the print task to which the print job belongs is not that the print task includes multiple print jobs and one of the print jobs is being executed, the print job may be canceled.

One print job cancellation condition may be that if the print task to which the print job belongs is queued, and the print task is not a print task that the print task includes multiple print jobs and one of the print jobs is being printed, the print job may be canceled.

If the print task including multiple print jobs is queued, but any one of the print jobs is not being printed, each print job of the print task may be canceled, that is, entire print task may be directly canceled. However, if the queued print task includes multiple print jobs and one of the print jobs is being printed, any print job of the print task may not be canceled.

Above-mentioned determination may be to avoid following scenario. When the print job belongs to the print task including multiple same print jobs, the first print job has a large number of pages, so that the first print job may take a long time for the image forming apparatus to print. As a result, when the second print job (which is same with the first print job) is printed again, the difference between the creation time acquired by analyzing the second print job and current time may exceed the first preset value, resulting in the second the print job being deleted by mistake. When two copies of a print document are to be printed, that is, when one print task includes two same print jobs, the processing time of the first print job may be excessively long. As a result, the starting time of the second print job may exceed a preset time when the second print job is printed, and the second print job may be mistakenly deleted because the creation time of both print jobs in the print task is same.

When the print job does not belong to the print task monitored in the print queue of the image forming apparatus, the print job may be overtime from the creation time to the analysis time, and the print job may need to be deleted. In such way, it prevents that the print job issued may be kept in the print spooler of the computer for a long time which may cause that the print job may be executed to be outputted if the user has left the printer or does not need to print the print job again, and, resulting in information leakage or unnecessary waste of print paper.

If the print job belongs to the print task monitored in the print queue of the image forming apparatus, and the print job is waiting, not printing, it is possible that the print job has been waiting to be printed for a long time, and the user of the print job has left the image forming apparatus. In order to ensure the confidentiality of the print job, the print job may be deleted, and no print output may be performed.

Figure 4:
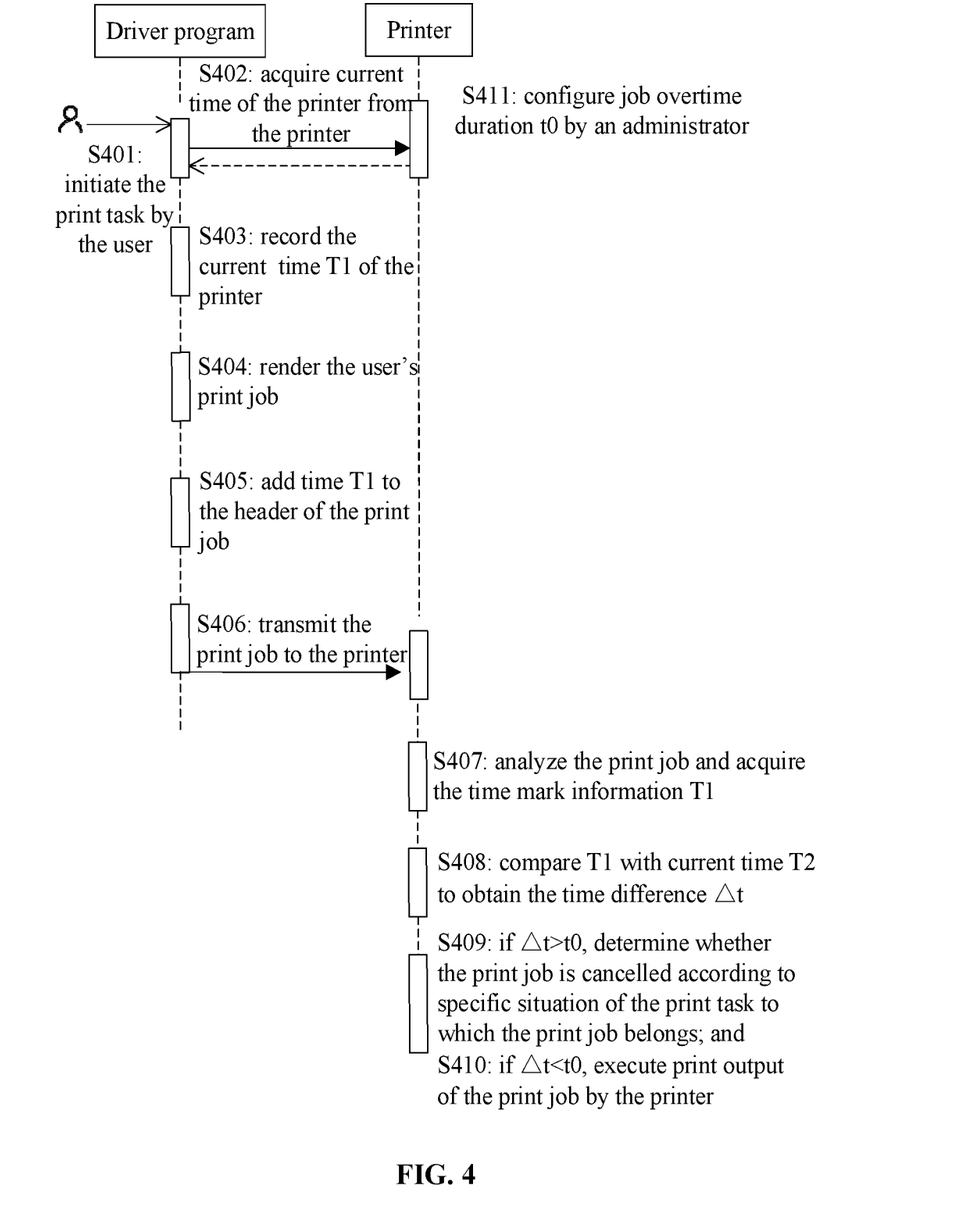
FIG. 4 illustrates a flow chart of identifying whether a received print job is an overtime job at a printer side provided by exemplary embodiments of the present disclosure.

For example, FIG. 4 illustrates a flow chart of identifying whether a received print job is an overtime job at a printer side provided by exemplary embodiments of the present disclosure.

At S401, the user may initiate a print task, for example, the user may click on a certain file to execute printing.

At S402, when the print driver starts to render the print job, current time T1 of the printer may be acquired from the printer.

At S403, the print driver may record and save the time T1.

At S404, the print driver may render the user's print job.

At S405, the driver may add time T1 to the header of the print job.

At S406, the print driver may transmit the print job to the printer.

At S407, the printer may analyze the print job and acquire the time T1.

At S408, the printer may calculate the difference between current time T2 and the time T1 and obtain the time difference $\Delta t$.

At S409, if the time difference $\Delta t$ is greater than or equal to the first preset time t0, the printer may determine whether the print job is canceled according to specific situation of the print task to which the print job belongs.

At S410, if the time difference $\Delta t$ is less than the first preset time t0, the printer may execute print output of the print data of the print job.

Above-mentioned method may further include S411 that the administrator may configure the overtime duration t0 of the print job; by being configured by the administrator, other users may be prevented from arbitrarily setting the overtime duration of the printer.

When the printer identifies the time to clear the print job, the printer may notify the user through the status monitor of the control terminal and the panel of the printer: the print job will be deleted because it has not been printed for a long time, and please confirm whether the printer should be deleted. Optionally, if the notification is sent for more than a period of time and the user does not deny deleting the print job that has been waiting for overtime, the printer may automatically delete the overtime print job; and if the user chooses to confirm not to delete the print job after the notification, the print job may be queued. Through this reminder, the user may have an option to confirm the print job to be deleted, which may avoid accidental deletion.

Through above-mentioned solutions, the problems existing in following scenarios in the existing technology may be solved.

The printer may continue to print multiple jobs, and multiple users may send print jobs to the printer. A new user may send a print job to the printer; and since the user does not know how long it would take for previous print jobs to be completed, the user may give up waiting for the print job to be printed. However, the user may not cancel the print job sent to the print spooler, which may result in that after the printer completes previous print jobs, the queued print job of the user may be printed out, and the user may not in front of the apparatus, resulting in print content leakage. To cancel the print job sent to the print spooler, only a user with a certain technical knowledge may find a job deleting manner, and different operating systems may have different processing manners. According to embodiments of the present disclosure, when the print job is received on the printer side, it determines whether the print job is an overtime print job; if the print job is an overtime print job, the print job may be deleted to effectively prevent arbitrary output of the print jobs that have been in the print spooler for a long time, which may not only save printing resources, but also prevent print data leakage.

Optionally, for above-mentioned time T1, the current time of the computer may be acquired as the time T1 when the user initiates the print task at S401, or the current time of the printer may be acquired from the printer as the time T1. At this point, S402 and S403 may be omitted.

Optionally, at S401, when the user initiates the print task, the current time of the computer may be acquired as time T3, and S402 and S403 may be continued; at S402, the current time of the computer may be acquired again as the time T1, or the current time of the printer may be acquired from the printer as the time T1; a determination step may be added after S403 to compare T3 and T1. If the time difference is greater than or equal to a preset time, it indicates that the time from the user initiating the print task to the rendering of the print driver may exceed a preset time, such as 10 minutes, then it is possible that the user may currently leave the printer due to the long wait time. Therefore, the print driver may identify the overtime print job according to the difference between T3 and T1 and cancel the print job without further rendering. Furthermore, the print driver may store the canceled print job as a backup, so that the user may resume printing.

For example, at S409, a possible application scenario may be that at S401, the user may select to print two copies of a 50-page document. In such way, when the printer has a hard disk that can buffer multiple received print jobs, the printer may store two copies of 50-page print jobs in the hard disk simultaneously and create a print task in the print queue of the printer. When analyzing the first copy of the 50-page print job, the creation time carried in the header of the print job may be acquired, and the time difference compared with the current time may be less than the first preset value, such that the first copy of the 50-page print job may execute print output. After the first copy of the 50-page print job, when analysis of the second copy of the 50-page print job continues to be performed, the creation time may be acquired from the header of the second copy of the 50-page print job, and the difference between the creation time and the current time may be greater than the first preset value. In such case, if it is incorrect to delete the second copy of the 50-page print job, which may not meet the user's multiple print needs. Therefore, through S409 in embodiments of the present disclosure, it further determines whether the print job belongs to an existing print task; and if the print job belongs to an existing print task, and the print task has multiple print jobs which are continuously being printed, the print job may not be deleted.

For S407-409 in FIG. 4, if the printer does not have a hard disk and has a small memory, such that, when the printer may not cache multiple print jobs or process multiple print tasks simultaneously, the printer may first analyze the creation time of the header after receiving the print job at S406. If the difference between the creation time and the current time is equal to or greater than the first preset value, and the print job does not belong to the print task currently existing in the printer, the print job may be deleted.

Exemplary Embodiment Two

The following application scenarios are described herein. The printer may fail during the printing process, such as paper shortage or internal paper jam; current user may not have the ability to troubleshoot the printer; and after next user clears the failure, unfinished print job of such user may be printed out, resulting in information leakage. Or, the computer may send print jobs continuously, and the printer may suddenly have a power failure/outage during the printing process. After the power supply is restored, the computer may re-send the print jobs to the printer for print output, resulting in information leakage.

Figure 5:
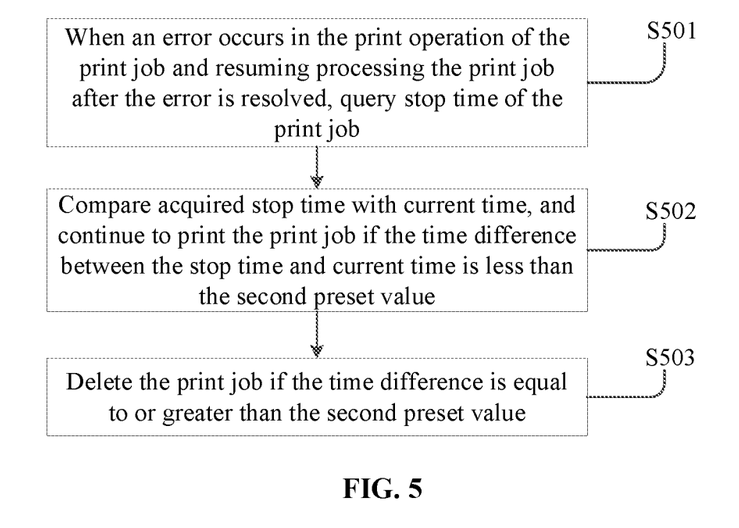
FIG. 5 illustrates a flow chart of a method for monitoring a print job provided by exemplary embodiment two of the present disclosure.

FIG. 5 illustrates a flow chart of a method for monitoring a print job provided by exemplary embodiment two of the present disclosure. The method may include following exemplary steps.

At S501, when an error occurs in the print operation and processing the print job is resumed after the error is resolved, the stop time of the print job may be queried.

At S502, acquired stop time may be compared with current time and printing the print job may continue if the time difference between the stop time and current time is less than the second preset value.

At S503, if the time difference between the stop time and current time is equal to or greater than the second preset value, the print job may be deleted.

Therefore, when the printer failure is resolved and processing the print job is resumed, print jobs that have been resumed over time may be identified by comparing the stop time with the current time, and the print jobs may be discarded without further output, which may prevent information leakage caused by restored print job output.

For example, at S501, through the time management unit and the job management unit, the printer may monitor various status information of the print job, acquire the stop status and stop time of the print job, calculate the stop period of the print job, and then control whether the print job continues to be executed after the failure is resolved.

The monitoring method provided by embodiments of the present disclosure may further include performing monitoring on the print tasks to be printed in the print queue in the image forming apparatus, identifying the print task whose wait time is equal to or greater than the third preset value, and cancelling such print job. The wait time may be calculated according to the comparison between the time when the printer receives the print task and current time or may be calculated according to the comparison between the time when the print task enters the print queue for waiting and current time. Therefore, it is possible to start from the print queue and perform overtime processing on the print tasks waiting to be printed, thereby protecting print data security.

Exemplary Embodiment Three

Figure 6:
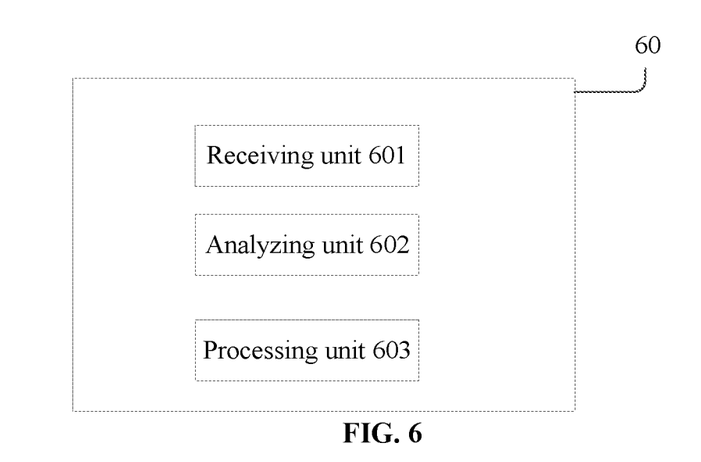
FIG. 6 illustrates a component schematic of modules of an apparatus monitoring a print job provided by exemplary embodiment three of the present disclosure.

Embodiments of the present disclosure provide an apparatus for monitoring a print job. As shown in FIG. 6, the monitoring apparatus 60 may include a receiving unit 601, an analyzing unit 602, and a processing unit 603.

The receiving unit 601 may be configured to receive the print job.

The analyzing unit 602 may be configured to analyze the print job and acquire the creation time of the print job.

The processing unit 603 may be configured to compare the creation time with the current time and continue to print the print job if the time difference between the creation time and current time is less than the first preset value.

If the time difference is equal to or greater than the first preset value, the processing unit 603 may determine whether the print job satisfies the print cancellation condition, and if the print job satisfies the print cancellation condition, cancel the print job.

According to embodiments of the present disclosure, when the print job is received, it determines whether the print job is an overtime print job; if the print job is an overtime print job, the print job may be deleted to effectively prevent arbitrary output of the print jobs that have been in the print spooler for a long time, which may not only save printing resources, but also prevent print data leakage.

The monitoring apparatus 60 may further include a time acquiring unit, configured for the print driver to acquire the first time from the image forming apparatus or the computer before receiving the print job, and add the first time to the print job as the creation time. Optionally, submission time may be used as the creation time when the user submits the print job.

The processing unit 603 may determine whether the print job satisfies the print cancellation condition, and if the print job satisfies the print cancellation condition, cancel the print job, which may include determining whether the print job belongs to a print job monitored in the print queue of the image forming apparatus, if yes, determining whether the print task to which the print job belongs is a print task that includes multiple print jobs and is being continuously being printed, and if no, cancelling the print job. The objective of such processing may be to prevent multiple copies of a same print job from being deleted by mistake, which may not meet the user's requirement for collation printing.

In addition, the monitoring apparatus in embodiments of the present disclosure may be a virtual apparatus, for example, a monitoring application program that can be installed in one image forming apparatus. The monitoring application program may be executed to perform monitoring and maintenance of received jobs of the image forming apparatus.

Furthermore, the monitoring apparatus 60 may further include a querying unit, configured to query the stop time of the print job when an error occurs in the execution operation of the print job and when processing the print job is resumed after the error is resolved.

The processing unit 603 may be configured to compare acquired stop time with the current time; and continue to print the print job if the time difference is less than the second preset value and delete the print job if the time difference is equal to or greater than the second preset value. Deleting the print job may prevent the computer from re-sending the print job to the printer for output after print error is resolved, resulting in information leakage.

Similarity between exemplary embodiment three and above-mentioned embodiments may not be described in detail herein.

Exemplary Embodiment Four

Figure 7:
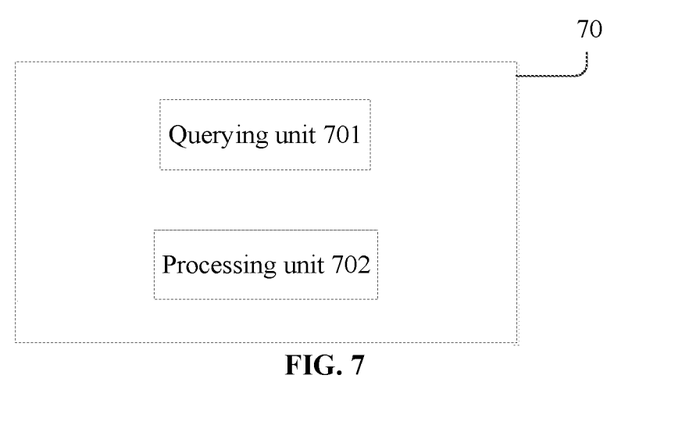
FIG. 7 illustrates a component schematic of modules of an apparatus monitoring a print job provided by exemplary embodiment four of the present disclosure.

Embodiments of the present disclosure provide a monitoring apparatus for a print job. As shown in FIG. 7, the monitoring apparatus 70 may include a querying unit 701 and a processing unit 702.

The querying unit 701 may be configured to query the stop time of the current print job when an error occurs in the print operation and processing the print job is resumed after the error is resolved.

The processing unit 702 may be configured to compare acquired stop time with the current time, continue to print the print job if the time difference is less than the second preset value, and delete the print job if the time difference is equal to or greater than the second preset value.

In addition, the monitoring apparatus in embodiments of the present disclosure may be a virtual apparatus, for example, a monitoring application program that can be installed in one image forming apparatus. The monitoring application program may be executed to perform monitoring and maintenance of received jobs of the image forming apparatus.

Similarity between exemplary embodiment four and above-mentioned embodiments may not be described in detail herein.

In addition, embodiments of the present disclosure also provide an electronic apparatus, including a memory, a processor, and a computer program. The computer program may be stored in the memory and configured to be executed by the processor to execute above-mentioned monitoring method.

Furthermore, embodiments of the present disclosure also provide a computer-readable storage medium, including a stored computer program. When the program is executed, above-mentioned monitoring method may be executed.

From the above-mentioned embodiments, it may be seen that the solutions provided by the present disclosure may achieve at least the following beneficial effects.

According to embodiments of the present disclosure, the print job may be monitored in real time on the printer side, which may prevent information leakage due to the failure of processing the print job overtime and effectively improve security performance of the print operation.

Above descriptions are only preferred embodiments of the present disclosure and are not intended to limit the present disclosure. Any modification, equivalent replacement, improvement and the like made within the spirit and principle of the present disclosure shall be included within the protection scope of the present disclosure.

What is claimed is:

1. A method for monitoring a print job, comprising:
   receiving a print job;
   analyzing the print job and acquiring creation time of the print job;
   comparing the creation time with current time, and continuing to print the print job in response to that a time difference between the creation time and the current time is less than a first preset value;
   determining whether the print job satisfies a print cancellation condition in response to that the time difference between the creation time and the current time is equal to or greater than the first preset value;
   determining the print job satisfies the print cancellation condition in response to that the print job is a first print job and a part of print task, and that the print task is not continuously being printed and excludes a second print job that is a repeat of the first print job; and
   cancelling the print job in response to that the print job satisfies the print cancellation condition.

2. The method according to claim 1, further including:
   acquiring a first time from an image forming apparatus or a computer and adding the first time to the print job as the creation time.

3. The method according to claim 1, wherein:
   the first preset value is configured by an administrator.

4. The method according to claim 1, wherein determining whether the print job satisfies the print cancellation condition includes:
   determining whether the print task is monitored in a print queue of the image forming apparatus.

5. The method according to claim 1, further including:
when an error occurs in a print operation of the print job and resuming processing the print job after the error is resolved, acquiring stop time of the print job;
comparing the stop time with the current time, and continuing to print the print job in response to that a time difference between the stop time and the current time is less than a second preset value; and
deleting the print job in response to that the time difference between the stop time and the current time is equal to or greater than the second preset value.

6. The method according to claim 1, further including:
using submission time as the creation time when a user submits the print job.

7. The method according to claim 1, wherein the creation time is acquired from a header of the print job.

8. An electronic apparatus, comprising: a memory, a processor, and a computer program, wherein the computer program is stored in the memory and configured to be executed by the processor to implement a method for monitoring a print job, the method comprising:
receiving a print job;
analyzing the print job and acquiring creation time of the print job;
comparing the creation time with current time, and continuing to print the print job in response to that a time difference between the creation time and the current time is less than a first preset value;
determining whether the print job satisfies a print cancellation condition in response to that the time difference between the creation time and the current time is equal to or greater than the first preset value;
determining the print job satisfies the print cancellation condition in response to that the print job is a first print job and a part of print task, and that the print task is not continuously being printed and excludes a second print job that is a repeat of the first print job; and
cancelling the print job in response to that the print job satisfies the print cancellation condition.

9. The apparatus according to claim 8, wherein the processor is further configured to:
acquire a first time from an image forming apparatus or a computer and add the first time to the print job as the creation time.

10. The apparatus according to claim 8, wherein:
the first preset value is configured by an administrator.

11. The apparatus according to claim 8, wherein determining whether the print job satisfies the print cancellation condition includes:
determining whether the print task is monitored in a print queue of the image forming apparatus.

12. The apparatus according to claim 8, wherein the processor is further configured to:
when an error occurs in a print operation of the print job and resuming processing the print job after the error is resolved, acquire stop time of the print job;
compare the acquired stop time with the current time, and continue to print the print job in response to that a time difference between the stop time and the current time is less than a second preset value; and
delete the print job in response to that the time difference between the stop time and the current time is equal to or greater than the second preset value.

13. The apparatus according to claim 8, wherein the processor is further configured to:
use submission time as the creation time when a user submits the print job.

* * * * *